US009558634B2

(12) United States Patent
Li

(10) Patent No.: US 9,558,634 B2

(45) Date of Patent: Jan. 31, 2017

(54) METHOD OF GAMING, A GAME CONTROLLER AND A GAMING SYSTEM

(71) Applicant: Aristocrat Technologies Australia Pty Limited, North Ryde (AU)

(72) Inventor: Jun Janelle Li, Pennant Hills (AU)

(73) Assignee: ARISTOCRAT TECHNOLOGIES AUSTRALIA PTY LIMITED (AU)

(*) Notice: Subject to any disclaimer, the term of this patent is extended or adjusted under 35 U.S.C. 154(b) by 0 days.

(21) Appl. No.: 13/960,913

(22) Filed: Aug. 7, 2013

(65) Prior Publication Data

US 2014/0045572 A1 Feb. 13, 2014

(30) Foreign Application Priority Data

Aug. 8, 2012 (AU) ................................ 2012903423

(51) Int. Cl.

*A63F 13/00* (2014.01)
*G07F 17/34* (2006.01)
*G07F 17/32* (2006.01)

(52) U.S. Cl.

CPC ............... *G07F 17/34* (2013.01); *G07F 17/32* (2013.01); *G07F 17/326* (2013.01)

(58) Field of Classification Search

None

See application file for complete search history.

(56) References Cited

U.S. PATENT DOCUMENTS

| | | | | |
|---|---|---|---|---|
| 6,093,102 | A * | 7/2000 | Bennett | 463/20 |
| 7,445,548 | B1 * | 11/2008 | Muskin | G07F 17/34 463/20 |
| 8,012,011 | B2 | 9/2011 | Baerlocher et al. | |
| 8,100,751 | B2 | 1/2012 | Jackson | |
| 2007/0032291 | A1 * | 2/2007 | Marks et al. | 463/20 |
| 2007/0066391 | A1 | 3/2007 | Kojima | |
| 2007/0232385 | A1 * | 10/2007 | Pace | 463/25 |
| 2008/0076524 | A1 * | 3/2008 | Ghaly | G07F 17/32 463/20 |
| 2008/0161096 | A1 | 7/2008 | Jackson | |
| 2008/0161097 | A1 * | 7/2008 | Baerlocher et al. | 463/20 |
| 2008/0176635 | A1 * | 7/2008 | Randall | 463/20 |

(Continued)

FOREIGN PATENT DOCUMENTS

| | | | |
|---|---|---|---|
| DE | 4125051 | A1 | 2/1993 |
| DE | 4143128 | A1 | 7/1993 |

(Continued)

*Primary Examiner* — Jason Yen

(74) *Attorney, Agent, or Firm* — McAndrews, Held & Malloy, Ltd.

(57) ABSTRACT

A method of gaming in a gaming system comprise selecting a plurality of symbols for display on a display of the gaming system at a plurality of display positions, each display position comprising a plurality of borders, each display position having a least one common border with at least two other display positions. The method involves determining with the gaming system, whether there are one or more groups of at least three symbols corresponding to a designated winning symbol combination displayed at respective ones of a plurality of display positions linked in a contiguous group, the determination being based on the display positions sharing a common border. An award corresponding to a determined group is made.

31 Claims, 11 Drawing Sheets

(56) References Cited

U.S. PATENT DOCUMENTS

| | | | | |
|---|---|---|---|---|
| 2009/0111557 | A1* | 4/2009 | Jankowski .......... | G07F 17/3244 463/20 |
| 2011/0039614 | A1 | 2/2011 | Caputo et al. | |

FOREIGN PATENT DOCUMENTS

| | | | |
|---|---|---|---|
| DE | 4143128 | C2 | 3/1996 |
| DE | 4125051 | C2 | 4/1996 |
| DE | 19618850 | A1 | 10/1997 |
| DE | 19618850 | C2 | 12/2001 |
| DE | 10315198 | A1 | 7/2004 |
| DE | 10315198 | B4 | 11/2004 |
| EP | 1205894 | A2 | 5/2002 |
| EP | 1205894 | A3 | 11/2003 |
| GB | 2380844 | A | 4/2003 |
| GB | 2460183 | A | 11/2009 |
| JP | 2006341133 | A | 12/2006 |
| JP | 2007068781 | A | 3/2007 |
| JP | 3939739 | B2 | 7/2007 |
| JP | 2008043727 | A | 2/2008 |
| JP | 2008245696 | A | 10/2008 |
| JP | 2009039580 | A | 2/2009 |
| JP | 2009050617 | A | 3/2009 |
| JP | 2009112878 | A | 5/2009 |
| JP | 2009254735 | A | 11/2009 |
| JP | 2009285395 | A | 12/2009 |
| JP | 2010022861 | A | 2/2010 |
| JP | 2010029493 | A | 2/2010 |
| JP | 2010029524 | A | 2/2010 |
| JP | 2010063741 | A | 3/2010 |
| JP | 4462376 | B2 | 5/2010 |
| JP | 2010214140 | A | 9/2010 |
| JP | 2011045462 | A | 3/2011 |
| JP | 2011189182 | A | 9/2011 |
| JP | 2011245336 | A | 12/2011 |
| JP | 4871969 | B2 | 2/2012 |
| WO | 2008089512 | A1 | 7/2008 |
| WO | 2008089512 | A8 | 10/2008 |

* cited by examiner

METHOD OF GAMING, A GAME CONTROLLER AND A GAMING SYSTEM

RELATED APPLICATIONS

This application claims priority to Australian Provisional Patent Application No. 2012903423 having an International filing date of Aug. 8, 2012, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Many spinning reel games require a player to select how many "win lines" or "pay lines" lines they will play in each game. For example, a minimum of one line up to the maximum number of lines allowed by the game. Such win lines are typically formed by one symbol position from each reel, with the symbol positions being located relative to one another such that they form a line across the reels.

In another type of spinning reel game, players select a number of reels to play. Such games are marketed under the trade name "Reel Power" by Aristocrat Leisure Industries Pty Ltd. The selection of a reel means that all symbols displayed at symbol display positions corresponding to a selected reel can be used to form winning symbol combinations with symbols displayed at a designated, symbol display positions of unselected reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

While such gaming systems provide players with enjoyment, a need exists for alternative gaming systems in order to maintain or increase player enjoyment.

BRIEF SUMMARY OF THE INVENTION

In a first aspect, the invention provides a method of gaming in a gaming system comprising:

selecting a plurality of symbols for display on a display of the gaming system at a plurality of display positions, each display position comprising a plurality of borders, each display position having a least one common border with at least two other display positions;

determining with the gaming system, whether there are one or more groups of at least three symbols corresponding to a designated winning symbol combination displayed at respective ones of a plurality of display positions linked in a contiguous group, the determination being based on the display positions sharing a common border; and making any award corresponding to a determined group.

In an embodiment, for at least one designated symbol, there are a plurality of different numbers of the designated symbol in respective ones of a plurality of winning combinations.

In an embodiment, there are a plurality of different designated symbols which correspond to winning symbol combinations.

In an embodiment, at least one award comprises a prize.

In an embodiment, at least one award comprises additional game play from which at least one additional award may be made.

In an embodiment, for at least one designated symbol there are winning combinations for between 3 and 3+N symbols, wherein 3+N corresponds to a maximum number of designated symbols in a winning combination.

In an embodiment, there is at least one display position that has at least three common borders with respective ones of at least three other display positions and determining whether there are one or more groups includes checking whether a group of designated symbols is at least partly formed by symbols disposed at the at least one display position and the at least three other display positions with which the at least one display position shares a common border.

In an embodiment, there is at least one display position that has at least four common borders with respective ones of at least four other display positions and determining whether there are one or more groups includes checking whether a group of designated symbols is at least partly formed by symbols disposed at the at least one display position and the at least four other display positions with which the at least one display position shares a common border.

In an embodiment, symbols are selected independently for each display position.

In an embodiment, each symbol display positions corresponds to a reel of symbols from which the symbol is selected for display at the respective display position.

In a second aspect, the invention provides a game controller for a gaming system, the game controller arranged to:

select a plurality of symbols for display on a display of the gaming system at a plurality of display positions, each display position comprising a plurality of borders, each display position having a least one common border with at least two other display positions;

determine, whether there are one or more groups of at least three symbols corresponding to a designated winning symbol combination displayed at respective ones of a plurality of display positions linked in a contiguous group, the determination being based on the display positions sharing a common border; and make any award corresponding to a determined group.

In an embodiment, for at least one designated symbol there are a plurality of different numbers of the designated symbol in respective ones of a plurality of winning combinations.

In an embodiment, there are a plurality of different designated symbols which correspond to winning symbol combinations.

In an embodiment, at least one award comprises a prize.

In an embodiment, at least one award comprises additional game play from which at least one additional award may be made.

In an embodiment, for at least one designated symbol there are winning combinations for between 3 and 3+N symbols, wherein 3+N corresponds to a maximum number of designated symbols in a winning combination.

In an embodiment, there is at least one display position that has at least three common borders with respective ones of at least three other display positions and the game controller determining whether there are one or more groups includes the game controller checking whether a group of designated symbols is at least partly formed by symbols disposed at the at least one display position and the at least three other display positions with which the at least one display position shares a common border.

In an embodiment, there is at least one display position that has at least four common borders with respective ones of at least four other display positions and the game controller determining whether there are one or more groups includes the game controller checking whether a group of designated symbols is at least partly formed by symbols disposed at the at least one display position and the at least four other display positions with which the at least one display position shares a common border.

In an embodiment, symbols are selected independently for each display position.

In an embodiment, each symbol display positions corresponds to a reel of symbols from which the symbol is selected for display at the respective display position.

In a third aspect, the invention provides a gaming system comprising:

a game play mechanism operable by a player to initiate a play of a game;

a display;

a symbol selector responsive to initiation of a play of the game and arranged to select a plurality of symbols for display on the display at a plurality of display positions, each display position comprising a plurality of borders, each display position having a least one common border with at least two other display positions;

a symbol group determiner arranged to determine whether there are one or more groups of at least three symbols corresponding to a designated winning symbol combination displayed at respective ones of a plurality of display positions linked in a contiguous group, the determination being based on the display positions sharing a common border; and a prize awarder arranged to make any award corresponding to a determined group.

In an embodiment, at least one designated symbol there are a plurality of different numbers of the designated symbol in respective ones of a plurality of winning combinations.

In an embodiment, there are a plurality of different designated symbols which correspond to winning symbol combinations.

In an embodiment, at least one award comprises a prize.

In an embodiment, at least one award comprises additional game play from which at least one additional award may be made.

In an embodiment, for at least one designated symbol there are winning combinations for between 3 and 3+N symbols, wherein 3+N corresponds to a maximum number of designated symbols in a winning combination.

In an embodiment, there is at least one display position that has at least three common borders with respective ones of at least three other display positions and determining whether there are one or more groups includes checking whether a group of designated symbols is at least partly formed by symbols disposed at the at least one display position and the at least three other display positions with which the at least one display position shares a common border.

In an embodiment, there is at least one display position that has at least four common borders with respective ones of at least four other display positions and determining whether there are one or more groups includes checking whether a group of designated symbols is at least partly formed by symbols disposed at the at least one display position and the at least four other display positions with which the at least one display position shares a common border.

In an embodiment, symbols are selected independently for each display position.

In an embodiment, each symbol display positions corresponds to a reel of symbols from which the symbol is selected for display at the respective display position.

In a fourth aspect, the invention provides a gaming system comprising:

means for selecting a plurality of symbols for display on a display of the gaming system at a plurality of display positions, each display position comprising a plurality of borders, each display position having a least one common border with at least two other display positions;

means for determining with the gaming system, whether there are one or more groups of at least three symbols corresponding to a designated winning symbol combination displayed at respective ones of a plurality of display positions linked in a contiguous group, the determination being based on the display positions sharing a common border; and means for making any award corresponding to a determined group.

In a fifth aspect, the invention provides an electronic gaming machine comprising a display mounted within a cabinet and a game controller mounted within the cabinet having a processor for executing game program code in response to a player operating at least one input device to initiate a play of the game, to implement a game in which the game controller selects a plurality of symbols for display on a display at a plurality of display positions, each display position comprising a plurality of borders, each display position having a least one common border with at least two other display positions, determines whether there are one or more groups of at least three symbols corresponding to a designated winning symbol combination displayed at respective ones of a plurality of display positions linked in a contiguous group, the determination being based on the display positions sharing a common border, and makes any award corresponding to a determined group.

In a sixth aspect, the invention provides computer program code which when executed implements the above method.

In a seventh aspect, the invention provides a tangible computer readable medium comprising the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
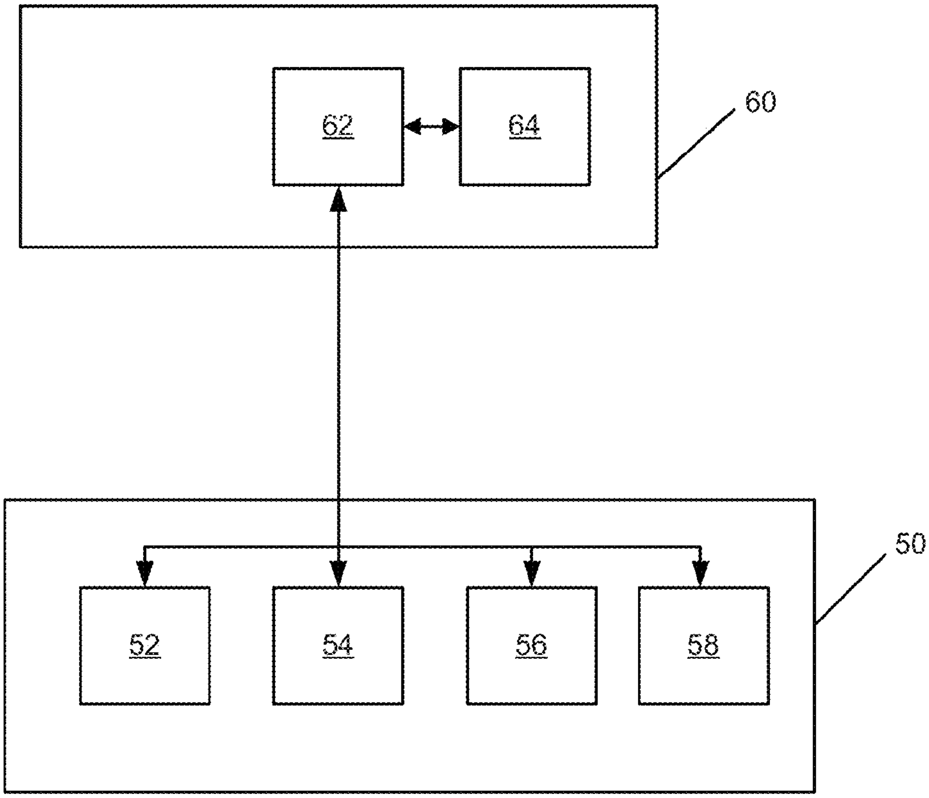
FIG. 1 is a block diagram of the core components of a gaming system.

Referring to the drawings, there is shown a gaming system having a game controller arranged to implement a game where winning outcomes are awarded based on groups of designated symbols that are determined to be grouped together in a group of three or more designated symbols based on the symbols being displayed at symbol display positions having a common border.

Accordingly, in contrast to existing techniques for awarding a prize, the evaluation is based on the position of symbols relative to one another rather than the symbols being on a win line or in symbol display positions. In particular, it will be appreciated that at least one symbol in such a group of symbols will share at least two common borders with other symbol display positions having the designated symbol in order for a group of symbols to be formed.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
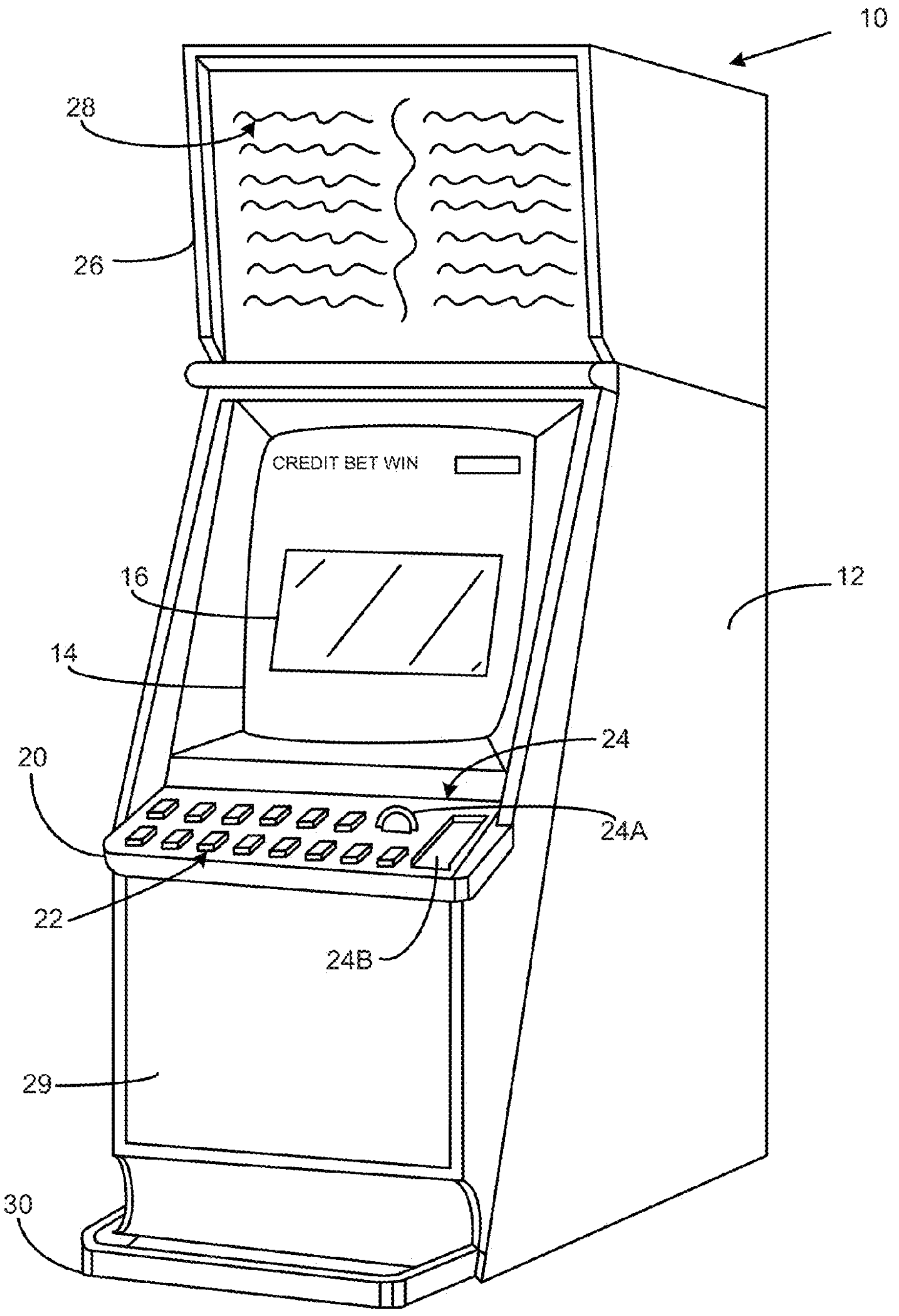
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
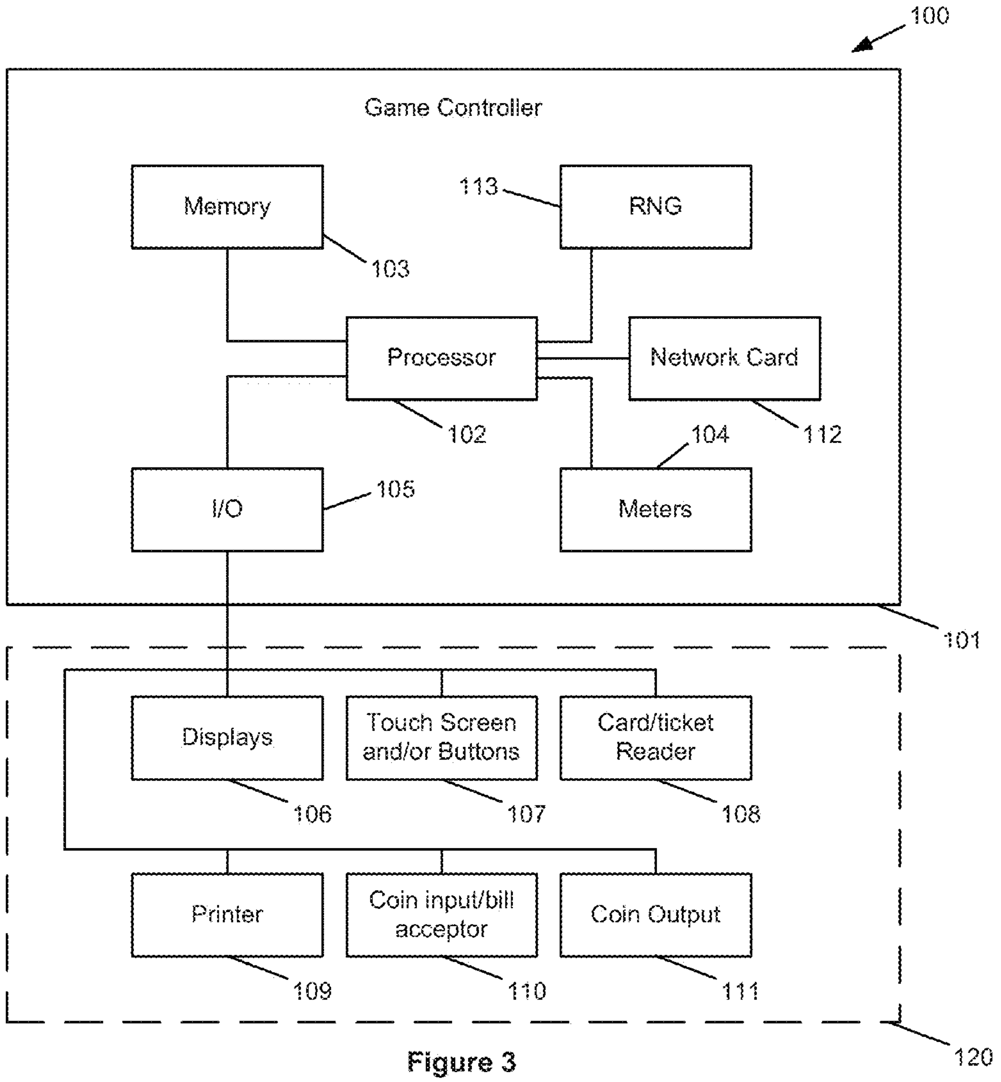
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
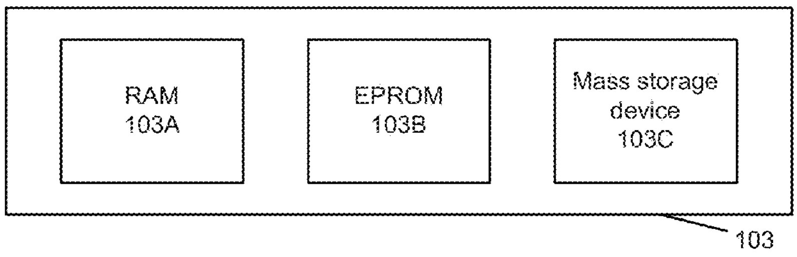
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
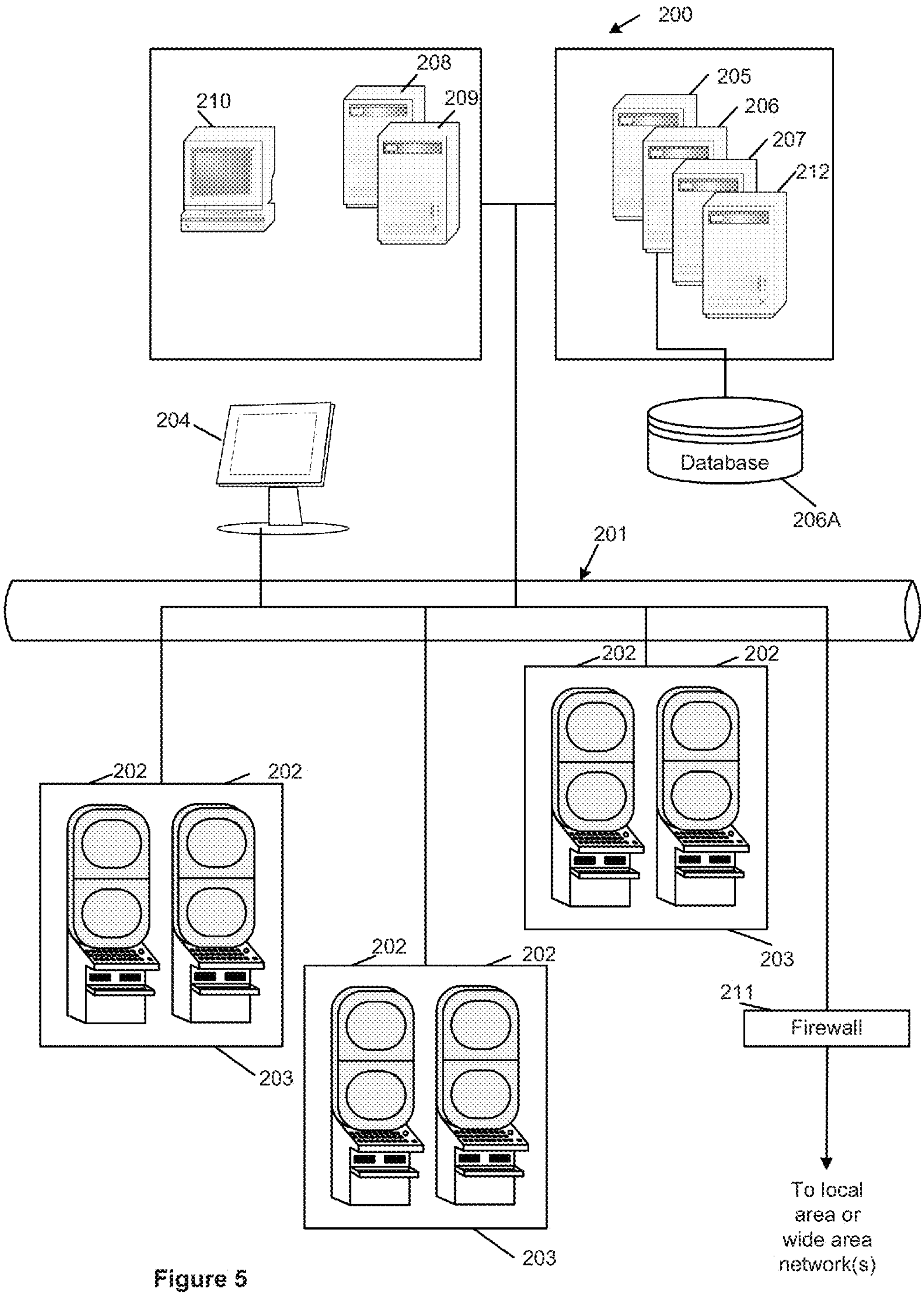
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
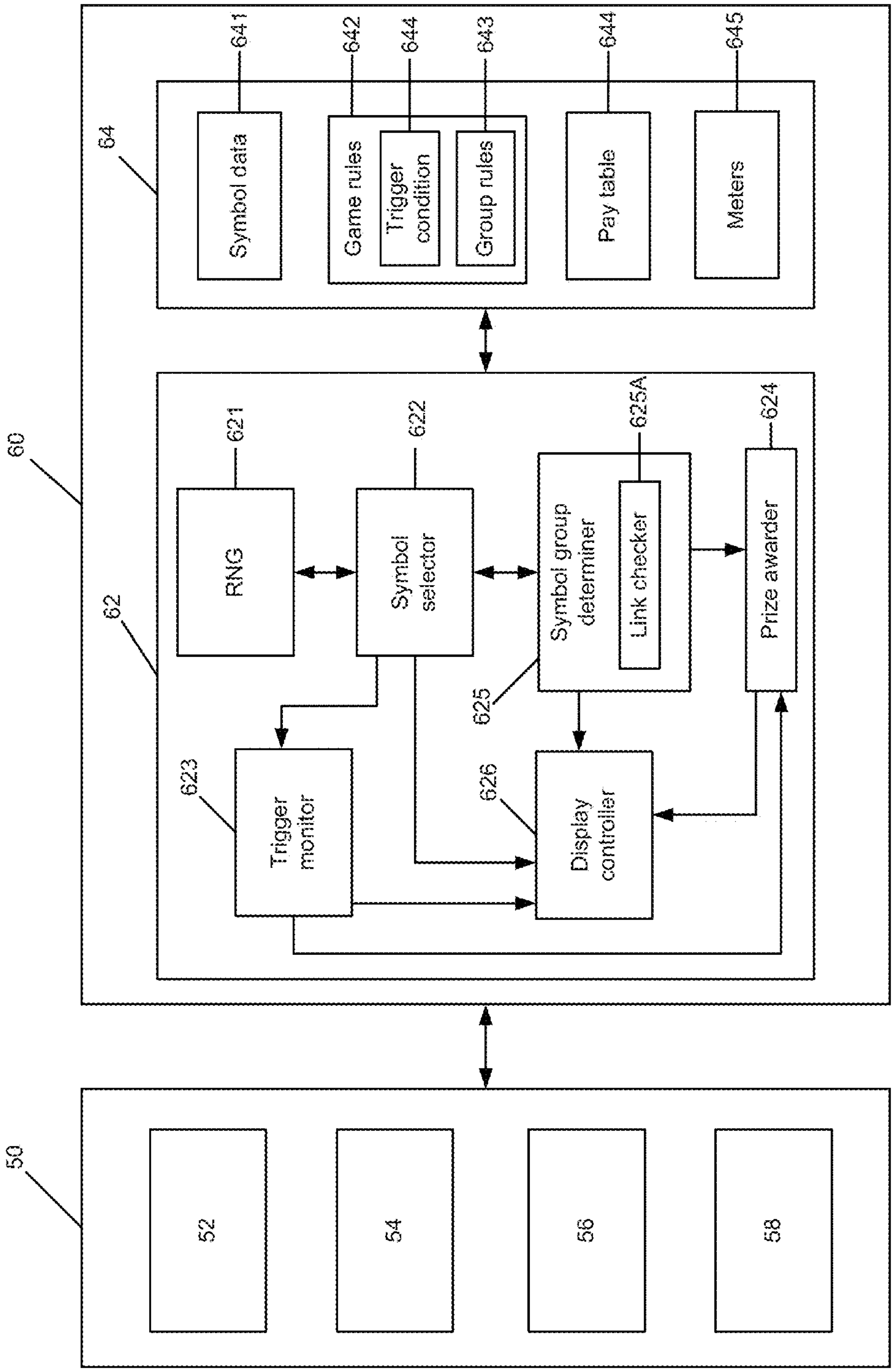
FIG. 6 is a further block diagram of a gaming system.

Referring to FIG. 6, the player operates the game play mechanism 56 to specify a wager and initiates a play of the game. In FIG. 6, the processor 62 of game controller 60 is shown implementing a number of modules based on program code and data stored in memory 64. Persons skilled in the art will appreciate that various of the modules could be implemented in some other way, for example by a dedicated circuit.

These modules include the symbol selector 622 which operates in response to the player's operation of game play mechanism 56 to place a wager and initiate a play of the game and selects symbols from a set of symbols specified by symbol data 641 using random number generator 621. The selected symbols are advised to the display controller 626 which causes them to be displayed on display 54 at a set of display positions.

One example of selecting symbols is for the symbol selector 622 to select symbols for display from a plurality of symbol sets corresponding to respective ones of a plurality of spinning reels. The symbol sets 641 can specify a sequence of symbols for each reel. In one embodiment, there is a reel for each display position in the array of display positions such that the symbol displayed at each symbol display position is selected independently of all other symbols by selecting a stopping position in the sequence for each reel. It is known to use a probability table stored in memory 64 to vary the odds of a particular stop position being selected. Other techniques can be used to control the odds of particular outcomes occurring to thereby control the return to player of the game. An advantage of employing reels is that the symbols can be displayed as spinning prior to the symbol being selected. Where this is not needed, the symbols could be drawn randomly from a set of symbols not having a sequence. In some embodiments, a reel may correspond to more than one symbol display position, for example a column of display positions. In such embodiments, the composition of the reels may be used to control the extent to which groups of symbols may be formed.

Figure 7:
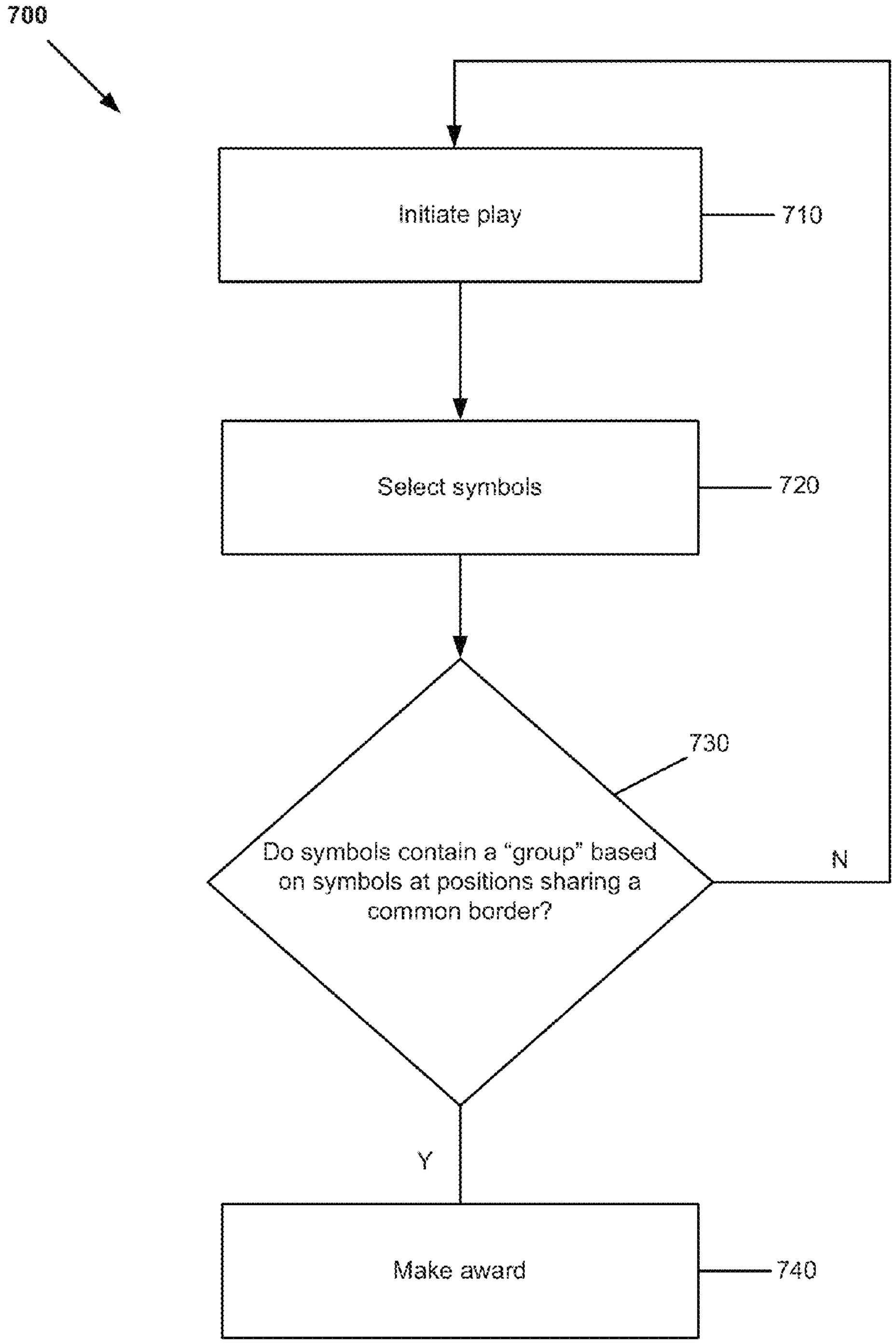
FIG. 7 is a flow chart of an embodiment.

FIG. 7 is a flow chart 700 of the operation of the gaming system according to this embodiment, involving initiating play of the game (step 710), selecting symbols for display on the display positions (step 720), and determining whether the symbols contain a group based on symbols at positions sharing a common border 730 (step 730). If so, that is the symbol display positions have a group of designated symbols, processing continues at step 740 and an award is made. The award may be of credits, some other prize, or of additional game play. If the symbol display positions do not have a group of designated symbols, processing returns to step 710.

Persons skilled in the art will appreciate that in some embodiments, there may be additional ways for a player to obtain an award, for example, if a designated number of scatter symbols appear within the array of display positions.

As indicated above, in one embodiment individual symbols are selected for display at each of the symbol display positions. In such an embodiment, there will be as many reels as symbol display positions. Accordingly, in the example shown in FIG. 8, there will be 25 separate reels defined by symbol data 641. The symbol selector 622 selects the stopping position in each of the reels. The selected symbol is advised to the display controller 626 which controls spinning of the reels to show each of the reels stopping at the positions selected by the symbol selector using the random number generator 621 to show the selected symbols.

Once the symbols have been selected and displayed at symbol display positions, the symbol group determiner 625 checks the selected symbols to determine whether there are sufficient designated symbols formed into a group of three or more symbols based on the symbols being positioned at symbol display positions that share a common border.

Referring to FIG. 8, it will be seen that the common border is defined by the four edges of the symbol display position such that symbol display positions in a corner such as symbol display position 831, have two common borders with neighboring symbol display positions, symbol display positions along an edge such as symbol display position 832 have three common borders with other symbol display positions and symbol display positions within the interior of the grid such as symbol display position 833 have four common borders. It will be appreciated that if the symbol display positions are a different shape, for example hexagon shaped or triangle shaped, they could have more or less common borders with other symbol display positions.

In the embodiment, the symbol group determiner 625, includes a link checker 625A that searches the symbol display positions until it finds symbol display positions linked by a common border that contain a designated symbol that can be used to form a winning combination. For example, Having located a pair of symbol display positions that are linked together by a common border and have the same designated symbol (being a symbol which corresponds to a winning combination), the link checker checks to see if either of those symbols are linked to a still further symbol of the same type—i.e. that there is a another designated symbol in a display position sharing a common border with either of the pair of symbol display positions and. The link checker uniquely identifies each combination of linked symbols such that a linked group of symbol display positions is only counted once. For example, referring to FIG. 8A, the symbol display positions are arranged in an array of five columns 801 to 805 and five rows 811 to 815. The link checker 625 searches row by row such that the first pair of designated symbols located are adventurer symbols 821. Having located those adventurer symbols as being linked symbols, being part of a potential group, the link checker determines whether any of the symbol display positions surrounding these two symbols that have not been checked also contain a designated symbol. In this respect, wagon symbol 822 can substitute for any designated symbol in a winning combination. That is, the wagon symbol is a WILD symbol. Accordingly, the wagon symbol 822 completes a group of three designated adventurer symbols 821 which provide a winning combination. A similar process occurs with respect to the cowgirl symbols 823 shown in FIG. 8A such that once a group has been established, a second group cannot be established for the same cowgirl symbol. Again, the wagon symbol is connected to the cowgirl symbol and forms part of the group. Upon sufficient linked symbols being determined such that a group symbols is located, the prize awarder 624 awards a prize based on an amount specified in pay table 644. If this award is an amount in credits, the award is added to the win meter of meters 645.

Persons skilled in the art will appreciate that the rules for grouping symbols are specified as part of group rules 643 which are a sub-component of the game rules 642 implemented by the program code.

The game may also incorporate a feature game and to this end a trigger monitor 623 may monitor the selected symbols 622 to determine whether a trigger condition 624 is met for conducting of a feature game. The trigger event may be, a symbol combination in the game, occurrence of a specific symbol in the game, be caused by a designated series of events in the game, be caused by another connected system, based on turnover, based on a random evaluation, etc.

Figure 8A:
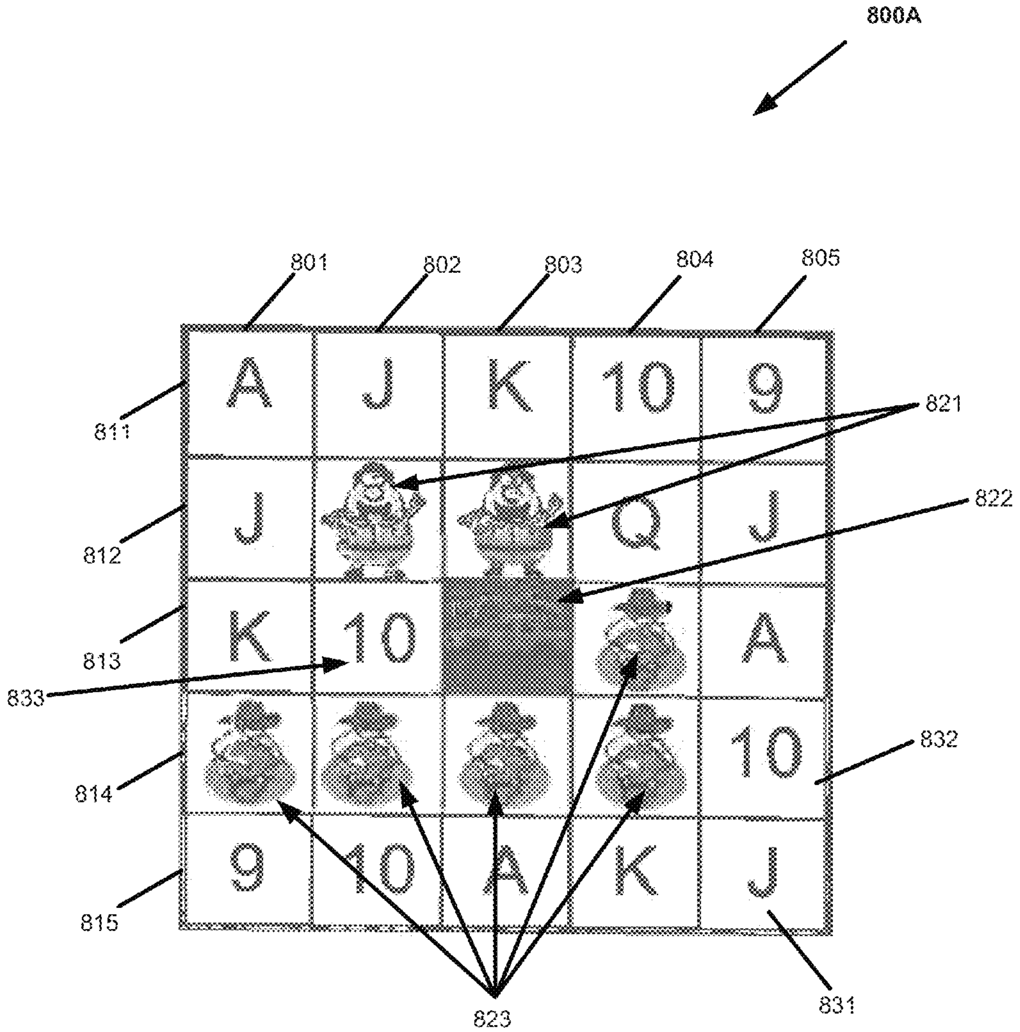
FIGS. 8A to 8D show examples of groups of designated symbol formed in accordance with embodiments of the invention.

Referring to the above, it will be apparent that there will always be at least one symbol of a group of symbols that is at a display position that has a shared border with at least two other symbol display positions having the designated symbol including a WILD symbol that is acting as and substituting for a designated symbol in the group of symbols. Further, it will be appreciated that in a square grid array such as shown in FIG. 8A, a symbol may be connected to up to four other symbols depending on the symbol display position at which the symbol is displayed.

Figure 8B:
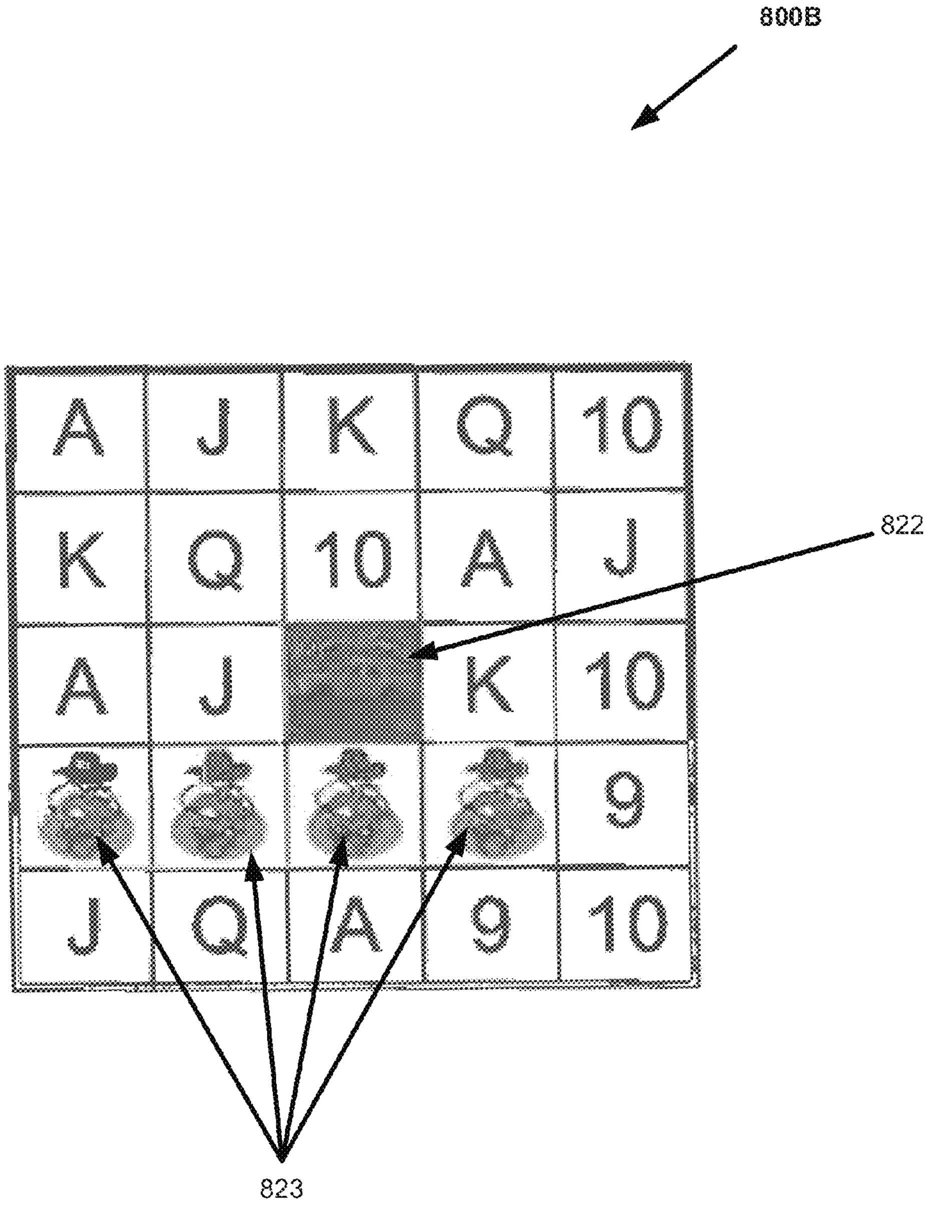
Figure 8C:
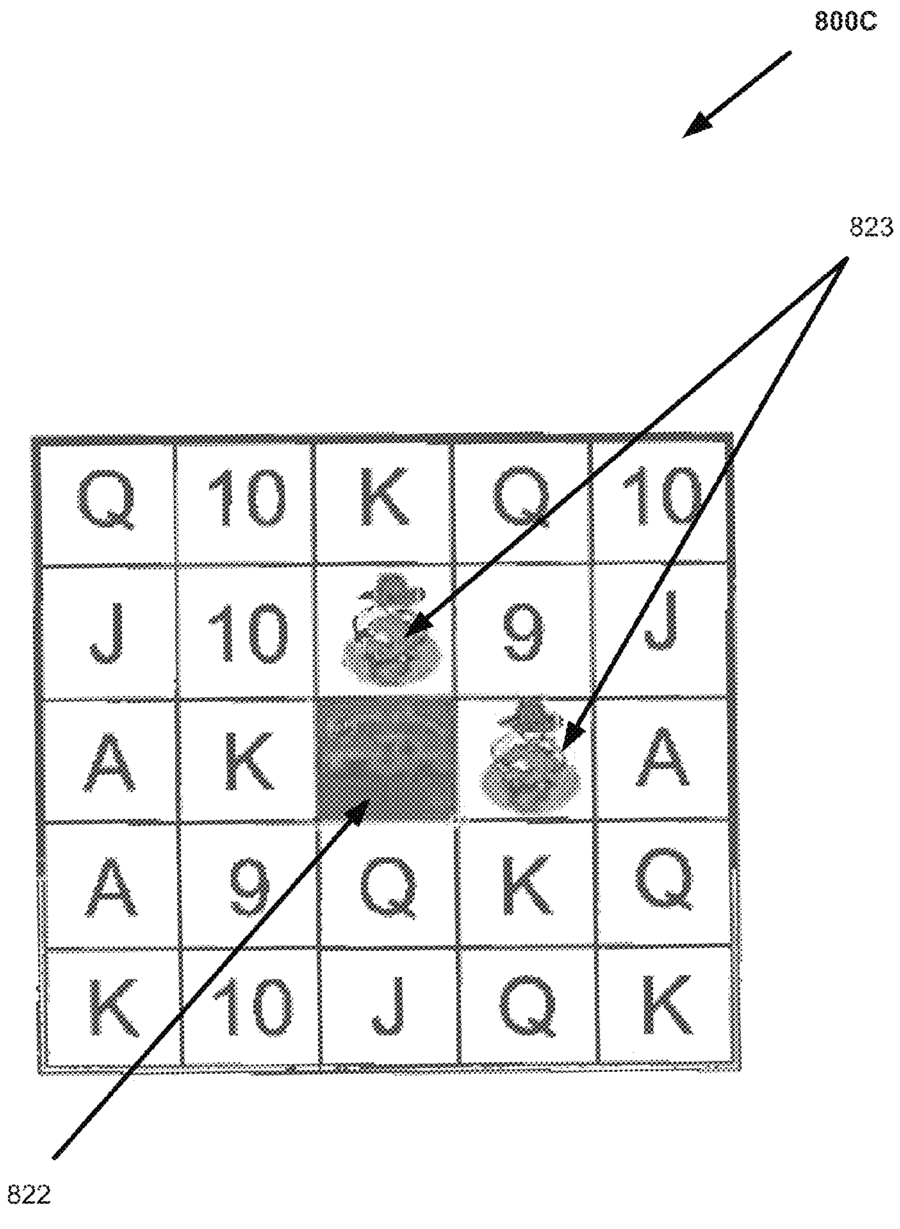
Figure 8D:
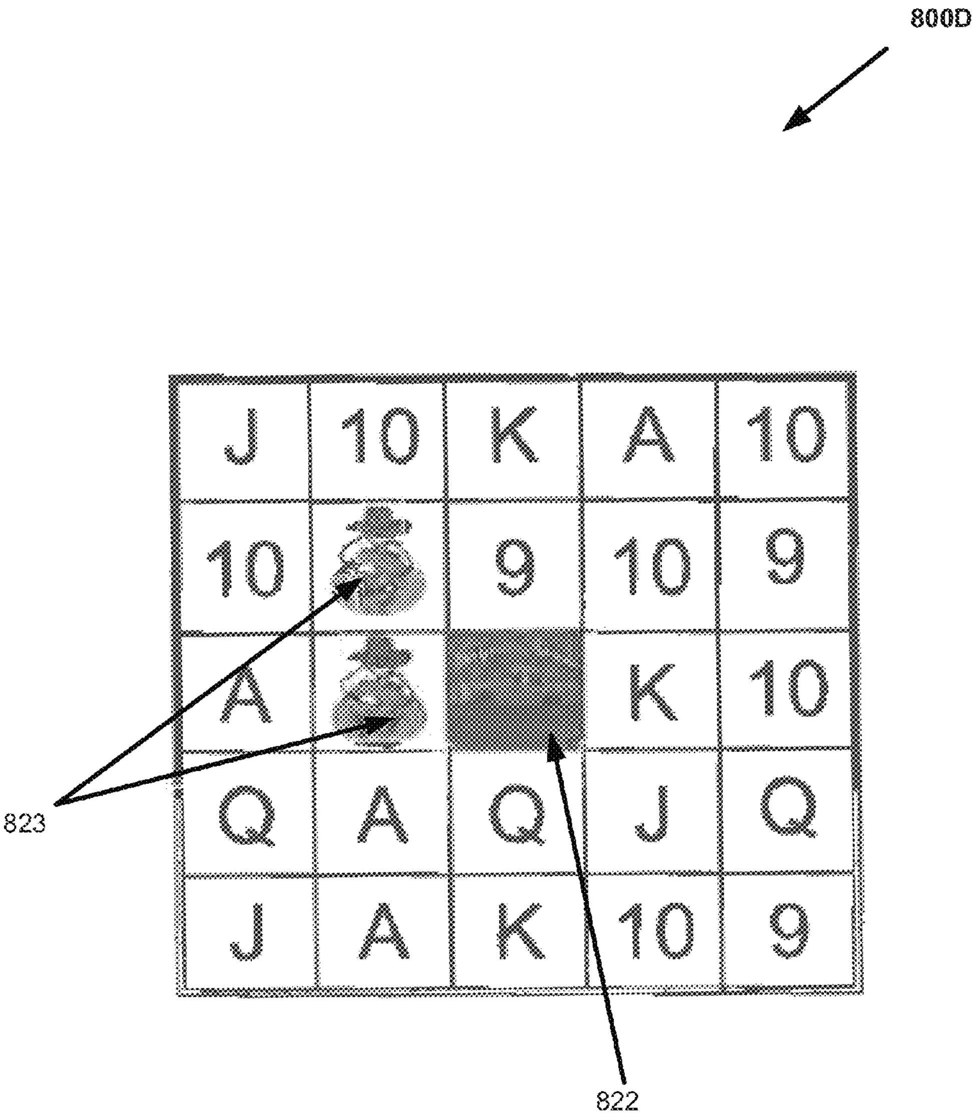

Referring to FIGS. 8B to 8D, there is shown an example of one way a feature game may be triggered. In one example, if the wagon symbol 822 as shown in FIG. 8B substitutes in a win, it stays on the display 800B for a subsequent spin of the reels and acts as a "STICKY WILD". That is, the symbol at that display position does not change while all the other symbols are changed by the reels being re-spun. If the wagon symbol substitutes for a character symbol (e.g. the adventurer or the cowgirl) the symbol animates to show that character getting ready for a trip. If the same wagon symbol substitutes for the same character three times in a row, the feature game is started.

As shown in FIG. 8B, wagon symbol 822 is substituted in a win for cowgirl symbols 823. In a second spin shown in FIG. 8C, there is a new array of symbols with the exception of a wagon symbol 822 shown at the same position as it is a sticky wild. Two other cowgirl symbols as shown connected to the wagon symbol to form a group of three cowgirl symbols. Finally, as shown in FIG. 8D, the wagon symbol 822 stays in the same position and two further cowgirl symbols 823 form part of the array of symbols 800D. Accordingly, the feature game is started.

In the embodiment, the feature game consists of play where a player can reach one of three stops or a final destination. Challenges need to be completed to reach the next stop. After the first stop, the player receives an award which is ten times the amount bet, after the second, twenty times the amount bet and after the third stop, forty times the amount bet. If they reach their destination, they are paid an award of 100 times the amount bet.

At the start of the feature game, the player is awarded ten free games (i.e. the player will not need to invest additional credits at least until the ten free games are exhausted). During the feature game, each time the wagon symbol is spun up it results in an extra free game. As indicated above, the wagon symbol acts as a sticky WILD symbol and can be used to form winning combinations with designated symbols that form part of the set of winning combinations specified in the pay table, however, it will not participate in triggering the feature game. Each time the player reaches a stop, the player can chose to take the credit prize. Alternatively, if the player still has additional free games, the player can chose to give up the credit prize and try to reach the next stop or the final destination to obtain the larger win. If the player fails to reach any stop, they will not get the additional prize for reaching the next stop and will only take the wins from free games.

The player is always shown the optimum choice to make upon reaching a stop. At the beginning of the feature, a treasure map unfolds and this overlaps on the five by five reels. A few positions are marked on the reels/map. To complete the challenge, the player needs to obtain winning combinations that overlap each of the marked positions. Once the player reaches a destination, the player obtains a new treasure map. Accordingly, to get to the first stop, the player may need to cover two positions with a winning combination. A person skilled in the art will appreciate that there can be variations, for example, there may be specific winning combinations required in order to cover a position on the treasure map.

Figure 9:
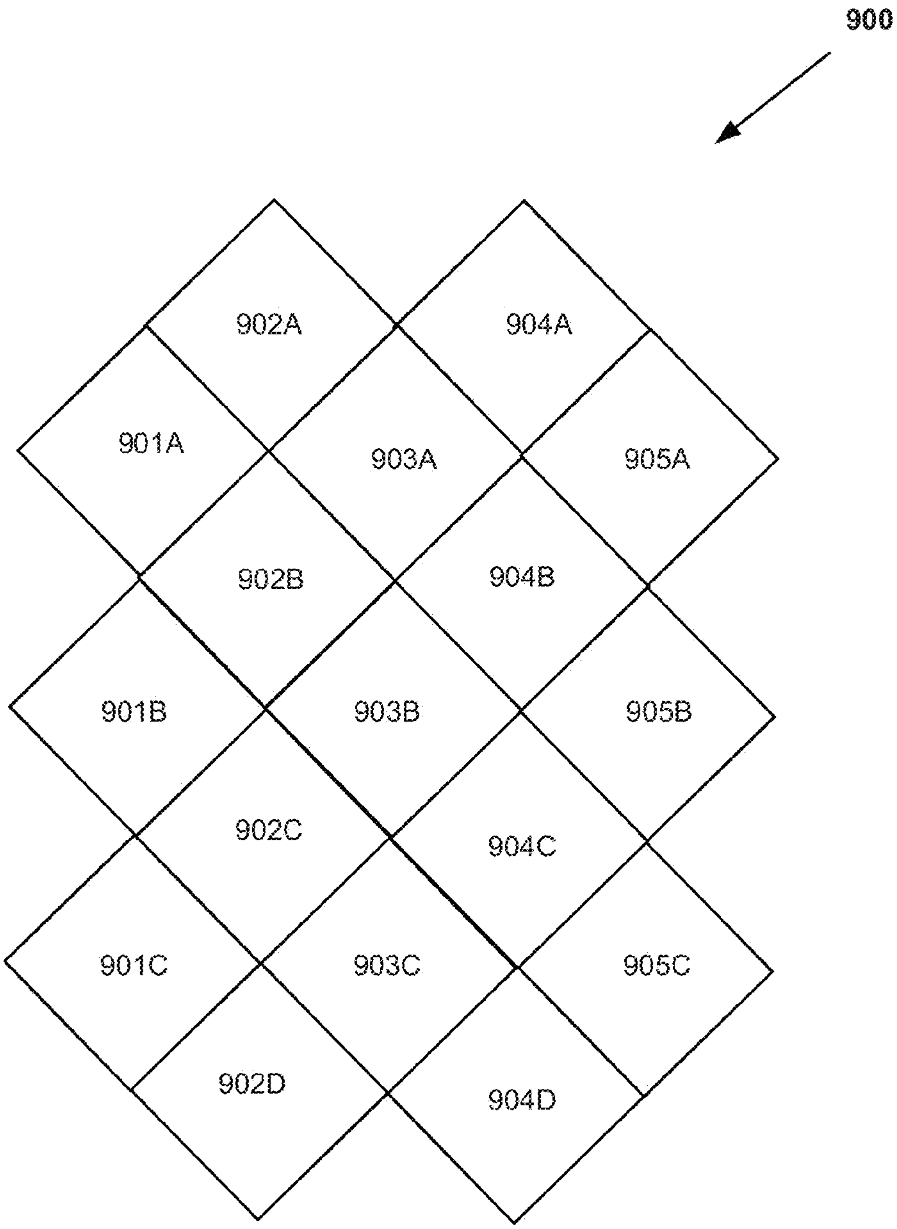
FIG. 9 shows an example of an arrangement of display positions.

Persons skilled in the art will appreciate that there can be other arrangements of symbol display positions. Referring to FIG. 9, for example, an array 900 of diamond shaped symbol display positions can be provided in five columns, namely column 901 comprising symbols display positions 901A, 901B and 901C, column 902 comprising symbol display positions 902A, 902B, 902C and 902D, column 903 comprising symbol display positions 903A, 903B and 903C, column 904 comprising symbol display positions 904A, 904B, 904C and 904D, and column 905 comprising symbol display positions 905A, 905B and 905C.

Persons skilled in the art will appreciate that typically, a win will result in some form of award being made such as an award of credits of additional game play from which further awards may be made. Such awards may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

The invention claimed is:

1. A method of gaming in a gaming system having a credit input mechanism configured to accept physical item associated with a monetary value for establishing a credit balance, the credit balance being increasable and decreasable based at least on wagering activity, an output mechanism configured to cause a payout associated with the credit balance, a game controller, the method comprising:

establishing a credit balance including receiving the physical item via said credit accepting mechanism;

in response to having established the credit balance via the credit accepting mechanism, decreasing the credit balance, and selecting, via the controller, a plurality of symbols for display on a display of the gaming system at a plurality of display positions, each display position comprising a plurality of borders, each border being defined by an edge of the display position, at least one of the borders being a common border between two display positions;

determining, via the controller, whether a first display position displays a designated symbol;

determining, via the controller, in response to determining that the first display position displays a designated symbol, whether each of a plurality of second display positions surrounding the first display position and sharing common borders with the first display position also displays the designated symbol;

in response to determining that both the first display position and at least one of the second display positions surrounding the first display position and sharing common borders with the first display position display the designated symbols, further determining, via the controller, whether each of a plurality of third display positions surrounding the first display position and the at least one of the second display positions and sharing common borders with at least one of the first display position and the at least one of the second display positions also displays the designated symbol;

in response to determining that a group formed from the first display position, the second display positions, and the third display positions displays at least three designated symbols, increasing via the game controller the credit balance; and making a payout via the payout mechanism in accord with the credit balance.

2. A method as claimed in claim 1, wherein for at least one designated symbol there are a plurality of different numbers of the designated symbol in respective ones of a plurality of winning combinations.

3. A method as claimed in claim 1, wherein there are a plurality of different designated symbols which correspond to winning symbol combinations.

4. A method as claimed in claim 1, wherein at least one award comprises a prize.

5. A method as claimed in claim 1, wherein at least one award comprises additional game play from which at least one additional award may be made.

6. A method as claimed in claim 1, wherein for at least one designated symbol there are winning combinations for between 3 and 3+N symbols, wherein 3+N corresponds to a maximum number of designated symbols in a winning combination.

7. A method as claimed in claim 1, wherein at least one display position has at least three common borders with respective ones of at least three other display positions and wherein a group of designated symbols is at least partly formed by symbols disposed at the at least one display position and the at least three other display positions with which the at least one display position shares a common border.

8. A method as claimed in claim 1, wherein at least one display position has at least four common borders with respective ones of at least four other display positions wherein a group of designated symbols is at least partly formed by symbols disposed at the at least one display position and the at least four other display positions with which the at least one display position shares a common border.

9. A method as claimed in claim 1, wherein symbols are selected independently for each display position.

10. A method as claimed in claim 1, wherein each symbol display position corresponds to a reel of symbols from which the symbol is selected for display at the respective display position.

11. A game controller for a gaming system having a credit input mechanism configured to accept physical item associated with a monetary value for establishing a credit balance, the credit balance being increasable and decreasable based at least on wagering activity, an output mechanism configured to cause a payout associated with the credit balance, a game controller, the game controller configured to:

establish a credit balance including receiving the physical item via said credit accepting mechanism;

in response to having established the credit balance via the credit accepting mechanism, decrease the credit balance, and select a plurality of symbols for display on a display of the gaming system at a plurality of display positions, each display position comprising a plurality of borders, each border being defined by an edge of the display position, at least one of the borders being a common border between two display positions;

determine whether a first display position displays a designated symbol;

determine, via the controller, in response to determining that the first display position displays a designated symbol, whether each of a plurality of second display positions surrounding the first display position and sharing common borders with the first display position also displays the designated symbol;

in response to determining that both the first display position and at least one of the second display positions surrounding the first display position and sharing common borders with the first display position display the designated symbols, further determining, via the controller, whether each of a plurality of third display positions surrounding the first display position and the at least one of the second display positions and sharing common borders with at least one of the first display position and the at least one of the second display positions also displays the designated symbol;

in response to determining that a group formed from the first display position, the second display positions, and the third display positions displays at least three designated symbols, increase the credit balance; and make via the payout mechanism in accord with the credit balance.

12. A game controller as claimed in claim 11, wherein for at least one designated symbol there are a plurality of different numbers of the designated symbol in respective ones of a plurality of winning combinations.

13. A game controller as claimed in claim 11, wherein there are a plurality of different designated symbols which correspond to winning symbol combinations.

14. A game controller as claimed in claim 11, wherein at least one award comprises a prize.

15. A game controller as claimed in claim 11, wherein at least one award comprises additional game play from which at least one additional award may be made.

16. A game controller as claimed in claim 11, wherein for at least one designated symbol there are winning combinations for between 3 and 3+N symbols, wherein 3+N corresponds to a maximum number of designated symbols in a winning combination.

17. A game controller as claimed in claim 11, wherein there is at least one display position has at least three common borders with respective ones of at least three other display positions and wherein a group of designated symbols is at least partly formed by symbols disposed at the at least one display position and the at least three other display positions with which the at least one display position shares a common border.

18. A game controller as claimed in claim 11, wherein at least one display position has at least four common borders with respective ones of at least four other display positions and wherein a group of designated symbols is at least partly formed by symbols disposed at the at least one display position and the at least four other display positions with which the at least one display position shares a common border.

19. A game controller as claimed in claim 11, wherein symbols are selected independently for each display position.

20. A game controller as claimed in claim 19, wherein each symbol display position corresponds to a reel of symbols from which the symbol is selected for display at the respective display position.

21. A gaming system comprising:

a credit input mechanism configured to accept physical item associated with a monetary value for establishing a credit balance, the credit balance being increasable and decreasable based at least on wagering activity;

a game play mechanism operable by a player to initiate a play of a game, in response to having established the credit balance via the credit accepting mechanism receiving the physical item;

a display;

a symbol selector responsive to initiation of a play of the game and configured to select a plurality of symbols for display on the display at a plurality of display positions, each display position comprising a plurality of borders, each border being defined by an edge of the display position, at least one of the borders being a common border between two display positions;

a symbol group determiner configured to determine whether a first display position displays a designated winning symbol, determine, via the controller, in response to determining that the first display position displays a designated winning symbol, whether each of a plurality of second display positions surrounding the first display position and sharing common borders with the first display position also displays the designated winning symbol, and in response to determining that both the first display position and at least one of the second display positions surrounding the first display position and sharing common borders with the first display position display the designated winning symbols, further determining, via the controller, whether each of a plurality of third display positions surrounding the first display position and the at least one of the second display positions and sharing common borders with at least one of the first display position and the at least one of the second display positions also displays the designated winning symbol; and a prize awarder configured to, in response to determining that a group formed from the first display position, the second display positions, and the third display positions displays at least three designated winning symbols, increase the credit balance, and to make in accord with the credit balance.

22. A gaming system as claimed in claim 21, wherein for at least one designated symbol there are a plurality of different numbers of the designated symbol in respective ones of a plurality of winning combinations.

23. A gaming system as claimed in claim 21, wherein there are a plurality of different designated symbols which correspond to winning symbol combinations.

24. A gaming system as claimed in claim 21, wherein at least one award comprises a prize.

25. A gaming system as claimed in claim 21, wherein at least one award comprises additional game play from which at least one additional award may be made.

26. A gaming system as claimed in claim 21, wherein for at least one designated symbol there are winning combinations for between 3 and 3+N symbols, wherein 3+N corresponds to a maximum number of designated symbols in a winning combination.

27. A gaming system as claimed in claim 21, wherein at least one display position that has at least three common borders with respective ones of at least three other display positions and wherein a group of designated symbols is at least partly formed by symbols disposed at the at least one display position and the at least three other display positions with which the at least one display position shares a common border.

28. A gaming system as claimed in claim 21, wherein at least one display position that has at least four common borders with respective ones of at least four other display positions and wherein a group of designated symbols is at least partly formed by symbols disposed at the at least one display position and the at least four other display positions with which the at least one display position shares a common border.

29. A gaming system as claimed in claim 21, wherein symbols are selected independently for each display position.

30. A gaming system as claimed in claim 29, wherein each symbol display position corresponds to a reel of symbols from which the symbol is selected for display at the respective display position.

31. An electronic gaming machine comprising a credit input mechanism configured to accept physical item associated with a monetary value for establishing a credit balance, the credit balance being increasable and decreasable based at least on wagering activity;

a game play mechanism operable by a player to initiate a play of a game, in response to having established the credit balance via the credit accepting mechanism receiving the physical item;

a display mounted within a cabinet, and a game controller mounted within the cabinet having a processor for executing game program code in response to a player operating at least one input device to initiate a play of the game, in response to having established the credit balance via the credit accepting mechanism receiving the physical item, to implement a game in which the game controller selects a plurality of symbols for display on a display at a plurality of display positions, each display position comprising a plurality of borders, each border being defined by an edge of the display position, each display position having at least one common border between two display positions, determines whether a first display position displays a designated winning symbol, determines, in response to determining that the first display position displays a designated winning symbol, whether each of a plurality of second display positions surrounding the first display position and sharing common borders with the first display position also displays the designated winning symbol, and in response to determining that both the first display position and at least one of the second display positions surrounding the first display position and sharing common borders with the first display position display the designated winning symbols, further determining, via the controller, whether each of a plurality of third display positions surrounding the first display position and the least one of the second display positions and sharing common borders with at least one of the first display position and the least one of the second display positions also displays the designated winning symbol, in response to determining that a group formed from the first display position, the second display positions, and the third display positions displays at least three designated winning symbols, increase the credit balance, and makes a payout in accord with the credit balance.

* * * * *